US009785228B2

(12) United States Patent
Schwesinger et al.

(10) Patent No.: US 9,785,228 B2
(45) Date of Patent: Oct. 10, 2017

(54) DETECTING NATURAL USER-INPUT ENGAGEMENT

(71) Applicant: MICROSOFT TECHNOLOGY LICENSING, LLC, Redmond, WA (US)

(72) Inventors: Mark Schwesinger, Bellevue, WA (US); Eduardo Escardo Raffo, Seattle, WA (US); Oscar Murillo, Redmond, WA (US); David Bastien, Kirkland, WA (US); Matthew H. Ahn, Bellevue, WA (US); Mauro Giusti, Redmond, WA (US); Kevin Endres, Redmond, WA (US); Christian Klein, Duvall, WA (US); Julia Schwarz, Pittsburgh, PA (US); Charles Claudius Marais, Duvall, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 33 days.

(21) Appl. No.: 13/764,056

(22) Filed: Feb. 11, 2013

(65) Prior Publication Data
US 2014/0225820 A1    Aug. 14, 2014

(51) Int. Cl.
*G09G 5/00* (2006.01)
*G06F 3/00* (2006.01)
*G06F 3/01* (2006.01)

(52) U.S. Cl.
CPC .............. *G06F 3/005* (2013.01); *G06F 3/011* (2013.01); *G06F 3/017* (2013.01)

(58) Field of Classification Search
CPC ............ G06F 3/005; G06F 3/011; G06F 3/017
See application file for complete search history.

(56) References Cited

U.S. PATENT DOCUMENTS 7,379,563 B2    5/2008  Shamaie
7,996,793 B2 *  8/2011  Latta et al. ................... 715/864
(Continued)

FOREIGN PATENT DOCUMENTS

| CN | 102165396 A | 8/2011 |
| CN | 102207771 A | 10/2011 |
| WO | 2012082971 A1 | 6/2012 |

OTHER PUBLICATIONS

Kim, et al., "Hand Grip Pattern Recognition for Mobile User Interfaces", Retrieved at <<http://ailab.kaist.ac.kr/papers/pdfs/AAAI06-296.pdf>>, In Proc. the Twenty-First National Conference on Artificial Intelligence, Jul. 16, 2006, pp. 6.
(Continued)

*Primary Examiner* — Ilana Spar
*Assistant Examiner* — Brent D Castiaux
(74) *Attorney, Agent, or Firm* — Alleman Hall Creasman & Tuttle LLP

(57) ABSTRACT

An NUI system to provide user input to a computer system. The NUI system includes a logic machine and an instruction-storage machine. The instruction-storage machine holds instructions that, when executed by the logic machine, cause the logic machine to detect an engagement gesture from a human subject or to compute an engagement metric reflecting the degree of the subject's engagement. The instructions also cause the logic machine to direct gesture-based user input from the subject to the computer system as soon as the engagement gesture is detected or the engagement metric exceeds a threshold.

18 Claims, 6 Drawing Sheets

(56) References Cited

U.S. PATENT DOCUMENTS

| | | | |
|---|---|---|---|
| 8,296,151 B2* | 10/2012 | Klein et al. | 704/275 |
| 8,782,567 B2* | 7/2014 | Latta et al. | 715/863 |
| 2009/0217211 A1* | 8/2009 | Hildreth | G06F 3/017 715/863 |
| 2010/0040292 A1* | 2/2010 | Clarkson | G06F 3/017 382/201 |
| 2010/0146464 A1 | 6/2010 | Wilson et al. | |
| 2010/0251116 A1* | 9/2010 | Rimas-Ribikauskas et al. | 715/702 |
| 2010/0281436 A1* | 11/2010 | Kipman et al. | 715/863 |
| 2011/0012855 A1 | 1/2011 | Yeh et al. | |
| 2011/0221755 A1* | 9/2011 | Geisner et al. | 345/474 |
| 2011/0279368 A1* | 11/2011 | Klein | G06F 3/011 345/158 |
| 2012/0001861 A1 | 1/2012 | Townsend et al. | |
| 2012/0019468 A1 | 1/2012 | Westerman et al. | |
| 2012/0192117 A1* | 7/2012 | Migos | G06F 17/241 715/863 |
| 2013/0027296 A1* | 1/2013 | Klein et al. | 345/156 |
| 2013/0066526 A1* | 3/2013 | Mondragon et al. | 701/48 |
| 2013/0154917 A1* | 6/2013 | Adermann et al. | 345/156 |
| 2013/0190086 A1* | 7/2013 | Maison et al. | 463/31 |
| 2013/0241819 A1* | 9/2013 | Yamashita | 345/156 |
| 2013/0278499 A1* | 10/2013 | Anderson | 345/156 |
| 2013/0329946 A1* | 12/2013 | Archibald | G06K 9/00335 382/103 |
| 2014/0049465 A1* | 2/2014 | Tremaine et al. | 345/156 |
| 2014/0119640 A1* | 5/2014 | Craig | 382/159 |
| 2014/0122086 A1* | 5/2014 | Kapur et al. | 704/275 |
| 2014/0132505 A1* | 5/2014 | Vennelakanti et al. | 345/156 |
| 2014/0140590 A1* | 5/2014 | Wilson et al. | 382/128 |
| 2014/0168075 A1* | 6/2014 | Markovic et al. | 345/156 |

OTHER PUBLICATIONS

Fritz, Justin, "New Sensor Technology Set to "Leap" Ahead of Microsoft", Retrieved at <<http://www.wallstreetdaily.com/2012/05/22/new-sensor-technology-set-to-leap-ahead-of-microsoft/>>, May 22, 2012, pp. 4.

European Patent Office, International Search Report & Written Opinion for PCT Application No. PCT/US2014/014972, May 16, 2014, 8 Pages.

The State Intellectual Property Office of China, First Office Action and Search Report issued in Chinese Patent Application No. 201480008293.6, Mar. 29, 2017, China, 19 pages.

* cited by examiner

DETECTING NATURAL USER-INPUT ENGAGEMENT

BACKGROUND

Natural user-input (NUI) technologies aim to provide intuitive modes of interaction between computer systems and human beings. Such modes may include gesture and/or voice recognition, as examples. Increasingly, a suitably configured vision and/or listening system may replace traditional interface hardware such as a keyboard, mouse, touch-screen, gamepad, or joystick controller, for various computer applications.

A function of any user-input technology is to detect user engagement—i.e., a condition wherein a user desires to provide input. With traditional interface hardware, user engagement is trivial to detect: every key press, screen touch, or movement of the mouse or joystick is an indication that the user desires to provide input. With NUI technologies, however, detection of user engagement is frequently not trivial.

SUMMARY

One embodiment of this disclosure presents an NUI system to provide user input to a computer system. The NUI system includes a logic machine and an instruction-storage machine. The instruction-storage machine holds instructions that, when executed by the logic machine, cause the logic machine to receive posture information for a human subject derived from depth video of that subject. The instructions also cause the logic machine to analyze the posture information to compute an engagement metric for the human subject, the engagement metric increasing with greater indication that the user wishes to engage the computer system and decreasing with lesser indication that the user wishes to engage the computer system. The instructions also cause the logic machine to determine, based on the engagement metric, whether to process the posture information as user input to the computer system.

In another embodiment, the instructions held in the instruction-storage machine cause the logic machine to analyze the posture information to detect an engagement gesture from the human subject. The instructions cause the logic machine to process the posture information as user input to the computer system as soon as the engagement gesture is detected, but to forego processing the posture information as user input to the computer system until the engagement gesture is detected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
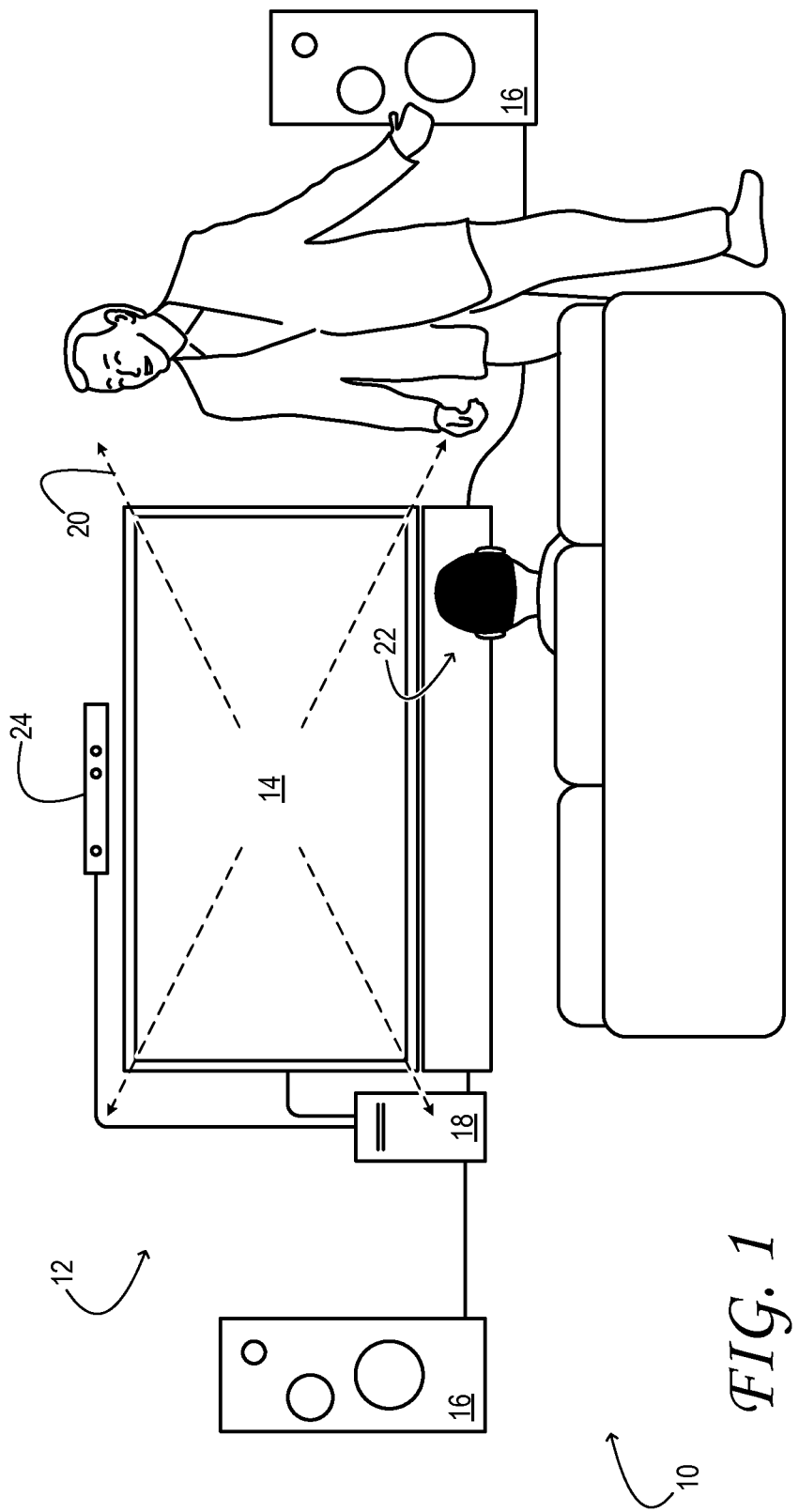
FIG. 1 shows aspects of an example environment in which NUI is used to control a computer or game system, in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

FIG. 1 shows aspects of an example environment 10. The illustrated environment is a living room or family room of a personal residence. However, the approaches described herein are equally applicable in other environments, such as retail stores and kiosks, restaurants, information kiosks, public-service environments, etc. In the environment of FIG. 1, a home-entertainment system 12 is installed. The home-entertainment system includes a large-format display 14 and loudspeakers 16, both operatively coupled to computer system 18. In the illustrated embodiment, the display presents computer-generated imagery (still images, video, graphical user interface elements, etc.) in display plane 20. In other embodiments, such as head-mounted display variants, the display plane may be positioned differently with respect to the display hardware. In some embodiments, the computer system may be a video-game system. In some embodiments, the computer system may be a multimedia system configured to play music and/or video. In some embodiments, the computer system may be a general-purpose computer system used for internet browsing and productivity applications, such as a word processor or spreadsheet application, for example. In general, computer system 18 may be configured for any or all of the above purposes, among others, without departing from the scope of this disclosure.

Computer system 18 may be configured to accept various forms of user input. As such, traditional user-input devices such as a keyboard, mouse, touch-screen, gamepad, or joystick controller (not shown in the drawings) may be operatively coupled to the computer system. Regardless of whether traditional user-input modalities are supported, computer system 18 is also configured to accept so-called natural user input (NUI) from at least one user 22. In the scenario represented in FIG. 1, the user is seated on a sofa; in other scenarios, the user may be lying down or standing, again without departing from the scope of this disclosure. To capture the various aspects of the NUI and provide corresponding input to computer system 18, an NUI interface system 24 is operatively coupled to the computer system. The computer and NUI interface systems may be coupled via a wired communications link, as shown in the drawing, or in any other suitable manner. Although FIG. 1 shows NUI interface system 24 and associated sensory hardware arranged atop display 14 and substantially within display plane 20, various other arrangements are contemplated as well. The NUI interface system could be mounted on a ceiling, for example.

Figure 2:
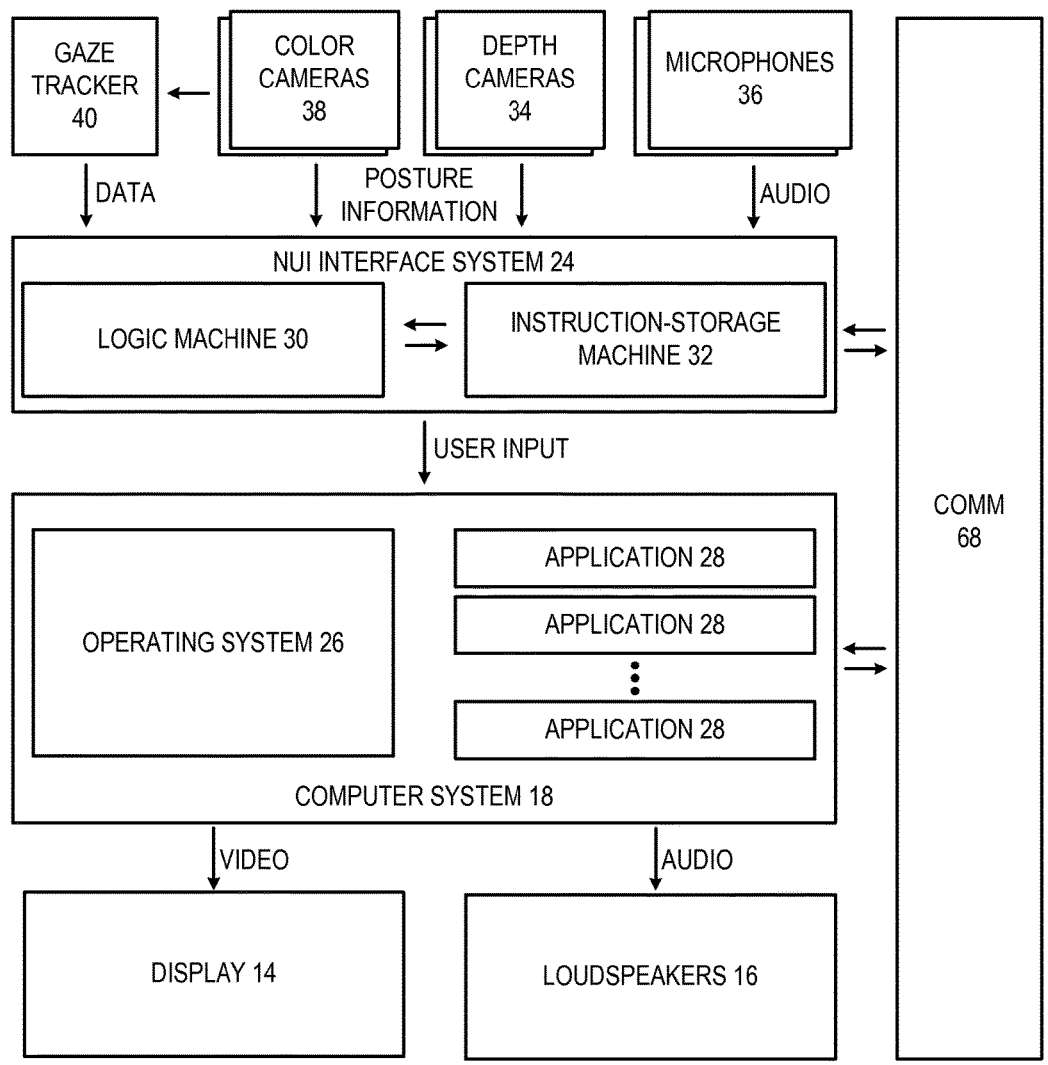
FIG. 2 shows aspects of a computer system and an NUI interface system in accordance with an embodiment of this disclosure.

FIG. 2 is a high-level schematic diagram showing the interoperability of computer system 18, NUI interface system 24, and associated componentry, in one example embodiment. The computer system includes operating system 26, which may be instantiated in software and/or firmware. Alternatively, the operating system may be instantiated in hardware—e.g., in system-on-a-chip architecture—at least in part. The computer system also includes one or more applications 28, such as a video-game application, a digital-media player, an internet browser, a photo editor, a word processor, and/or a spreadsheet application, for example. Naturally, the computer system may also include suitable data-storage, instruction-storage, and logic hardware, as needed to support the operating system and applications. In the embodiment of FIG. 2, computer system 18 is operatively coupled to display 14 and to loudspeakers 16 to provide multimedia output.

As noted above, NUI interface system 24 is configured to provide user input to computer system 18. To this end, the NUI interface system includes a logic machine 30 and an instruction-storage machine 32. To detect the user input, the NUI interface system receives low-level input (i.e., signal) from an array of sensory components, which may include one or more depth cameras 34, microphones 36, and cameras 38. In the illustrated embodiment, the sensory components also include an optional gaze tracker 40. The NUI interface system processes the low-level input from the sensory components to yield an actionable, high-level input to computer system 18. For example, the NUI interface system may perform sound- or voice-recognition on audio input from microphones 36. Such action may generate corresponding text-based user input or other high-level commands, which are received in computer system 18. In some embodiments, NUI interface system and sensory componentry may be integrated together, at least in part. In other embodiments, the NUI interface system may be integrated with the computer system and receive low-level input from peripheral sensory components.

Continuing in FIG. 2, each depth camera 34 may comprise an imaging system configured to acquire a time-resolved sequence of depth maps of one or more human subjects that it sights. As used herein, the term 'depth map' refers to an array of pixels registered to corresponding regions ($X_i$, $Y_i$) of an imaged scene, with a depth value $Z_i$ indicating, for each pixel, the depth of the corresponding region. 'Depth' is defined as a coordinate parallel to the optical axis of the depth camera, which increases with increasing distance from the depth camera. Operationally, a depth camera may be configured to acquire two-dimensional image data from which a depth map is obtained via downstream processing.

In general, the nature of depth cameras 34 may differ in the various embodiments of this disclosure. For example, a depth camera can be stationary, moving, or movable. Any non-stationary depth camera may have the ability to image an environment from a range of perspectives. In one embodiment, brightness or color data from two, stereoscopically oriented imaging arrays in a depth camera may be co-registered and used to construct a depth map. In other embodiments, a depth camera may be configured to project on the subject a structured infrared (IR) illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In still other embodiments, the depth camera may project a pulsed infrared illumination towards the subject. A pair of imaging arrays in the depth camera may be configured to detect the pulsed illumination reflected back from the subject. Both arrays may include an electronic shutter synchronized to the pulsed illumination, but the integration times for the arrays may differ, such that a pixel-resolved time-of-flight of the pulsed illumination, from the illumination source to the subject and then to the arrays, is discernible based on the relative amounts of light received in corresponding elements of the two arrays.

When included, each color camera 38 may image visible light from the observed scene in a plurality of channels (e.g., red, green, blue, etc.), mapping the imaged light to an array of pixels. Alternatively, a monochromatic camera may be included, which images the light in grayscale. The color or brightness values for all of the pixels collectively constitute a digital color image. In one embodiment, the depth and color cameras may have the same resolutions. Even when the resolutions differ, the pixels of the color camera may be registered to those of the depth camera. In this way, both color and depth information may be assessed for each portion of an observed scene. When included, each microphone 36 may pick up directional and/or non-directional sound from an observed human subject or other source in environment 10. It will be noted that the sensory data acquired through NUI interface system 24 may take the form of any suitable data structure, including one or more matrices that include X, Y, Z coordinates for every pixel imaged by the depth camera, red, green, and blue channel values for every pixel imaged by color camera, in addition to time resolved digital audio data.

Depth cameras 34, as described above, are naturally applicable to observing people. This is due in part to their ability to resolve a contour of a human subject even if that subject is moving, and even if the motion of the subject (or any part of the subject) is parallel to the optical axis of the camera. This ability is supported, amplified, and extended through the dedicated logic architecture of NUI interface system 24.

The configurations described above enable various methods for providing user input to a computer system. Some such methods are now described, by way of example, with continued reference to the above configurations. It will be understood, however, that the methods here described, and others within the scope of this disclosure, may be enabled by different configurations as well. The methods herein, which involve the observation of people in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized in a known manner. In other embodiments, personal data may be confined to a local system, and only non-personal, summary data transmitted to a remote system.

Figure 3:
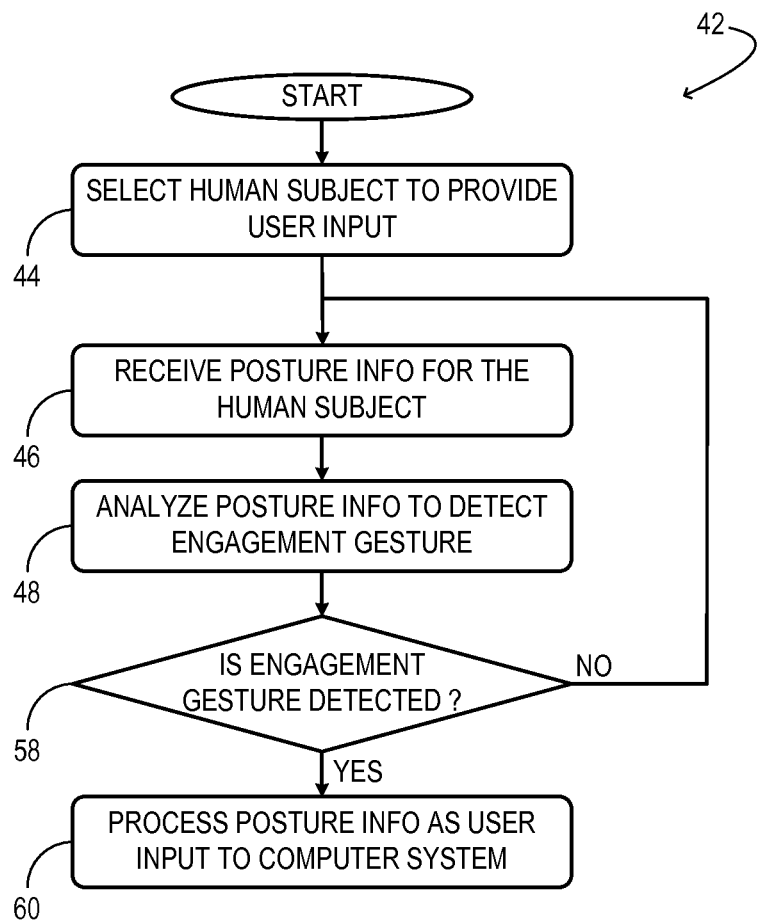
FIG. 3 illustrates an example method for providing user input to a computer system in accordance with an embodiment of this disclosure.

FIG. 3 illustrates an example method 42 for providing user input to a computer system. At 44 of method 42, a human subject is selected to provide the user input. To this end, NUI interface system 24 may be configured to analyze depth video from the one or more depth cameras connected thereto, and identify one or more candidate human subjects, or sections of the depth video in which candidate human subjects have been located.

Through appropriate depth-image processing, a given locus of a depth map can be recognized as belonging to a human subject (as opposed to some other thing, e.g., furniture, a wall covering, a cat). In one embodiment, pixels that belong to a human subject are identified by sectioning off a portion of the depth data that exhibits above-threshold motion over a suitable time scale, and attempting to fit that section to a generalized geometric model of a human being. If a suitable fit can be achieved, then the pixels in that section are recognized as those of a human subject. In other embodiments, human subjects may be identified by contour alone, irrespective of motion.

In one particular embodiment, NUI interface system 24 may analyze the depth data to distinguish human subjects from non-human subjects and background. To this end, each pixel of the depth map may be assigned a person index that identifies the pixel as belonging to a particular human subject or non-human element. As an example, pixels corresponding to a first person can be assigned a person index equal to one, pixels corresponding to a second person can be assigned a person index equal to two, and pixels that do not correspond to a human subject can be assigned a person index equal to zero. Person indices may be determined, assigned, and saved in any suitable manner.

After all the candidate human subjects are identified in the fields of view (FOVs) of each of the connected depth cameras, NUI interface system 24 may make the determination as to which human subject or subjects will provide user input to computer system 18. In one embodiment, a human subject may be selected based on proximity to display plane 20. This choice is reasonable, given that display 14 may present on the display plane various elements of a user interface of computer system 18, which the intended user may be attempting to control. In more particular embodiments, the human subject may be selected based on proximity to depth camera 34 and/or position in a field of view of the depth camera. More specifically, the selected human subject may be the subject closest to the display plane or depth camera, or, the subject nearest the center of the FOV of the depth camera. In some embodiments, the NUI interface system may also take into account the degree of translational motion of a subject—e.g., motion of the centroid of the subject—in determining whether that subject will be selected to provide user input. For example, a subject that is moving across the FOV of the depth camera (moving at all, moving above a threshold speed, etc.) may be excluded from providing user input. This determination is based on the inference that a person wishing to engage the NUI interface system will stand or be seated in front of the display plane or depth camera, rather than move through the camera's FOV. Naturally, however, a person wishing to engage the system may still move to some degree.

At 46 of method 42, posture information for the selected human subject is received by NUI interface system 24. The posture information may be derived computationally from depth video acquired with depth camera 34. At this stage of execution, additional sensory input—e.g., image data from a color camera 38 or audio data microphone 36—may be received as well, and may be used along with the posture information to assess the subject's engagement. Presently, an example mode of obtaining the posture information for a human subject will be described.

In one embodiment, NUI interface system 24 may be configured to analyze the pixels of a depth map that reveal a human subject, in order to determine what part of the subject's body each pixel corresponds to. A variety of different body-part assignment techniques can be used to this end. In one example, each pixel of the depth map with an appropriate person index (vide supra) may be assigned a body-part index. The body-part index may include a discrete identifier, confidence value, and/or body-part probability distribution indicating the body part or parts to which that pixel is likely to correspond. Body-part indices may be determined, assigned, and saved in any suitable manner.

In one example, machine-learning may be used to assign each pixel a body-part index and/or body-part probability distribution. The machine-learning approach analyzes a human subject using information learned from a previously trained collection of known poses. During a supervised training phase, for example, a variety of human subjects are observed in a variety of poses; trainers provide ground truth annotations labeling various machine-learning classifiers in the observed data. The observed data and annotations are then used to generate one or more machine-learned algorithms that map inputs (e.g., observation data from a depth camera) to desired outputs (e.g., body-part indices for relevant pixels).

Figure 4:
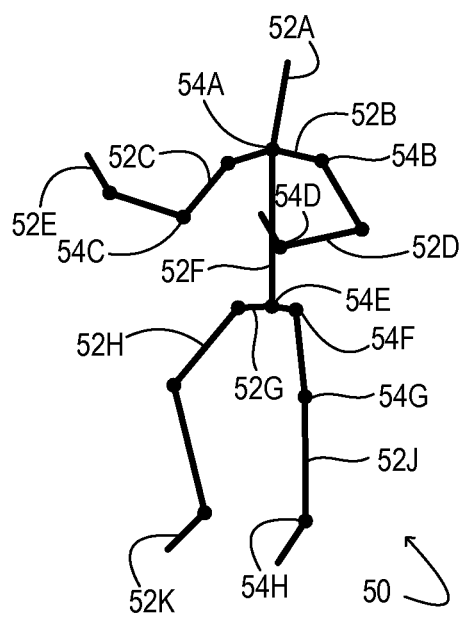
FIG. 4 shows aspects of an example virtual skeleton in accordance with an embodiment of this disclosure.

In some embodiments, a virtual skeleton is fit to the pixels of depth data that correspond to a human subject. FIG. 4 shows an example virtual skeleton 50 in one embodiment. The virtual skeleton includes a plurality of skeletal segments 52 pivotally coupled at a plurality of joints 54. In some embodiments, a body-part designation may be assigned to each skeletal segment and/or each joint. In FIG. 4, the body-part designation of each skeletal segment 52 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 54 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 4 is in no way limiting. A virtual skeleton consistent with this disclosure may include virtually any type and number of skeletal segments and joints.

In one embodiment, each joint may be assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. In this manner, the metrical data defining the virtual skeleton—its size, shape, and position and orientation relative to the depth camera may be assigned to the joints.

Via any suitable minimization approach, the lengths of the skeletal segments and the positions and rotational angles of the joints may be adjusted for agreement with the various contours of the depth map. This process may define the location and posture of the imaged human subject. Some skeletal-fitting algorithms may use the depth data in combination with other information, such as color-image data and/or kinetic data indicating how one locus of pixels moves with respect to another. As noted above, body-part indices may be assigned in advance of the minimization. The body-part indices may be used to seed, inform, or bias the fitting procedure to increase the rate of convergence. For example, if a given locus of pixels is designated as the head of the subject, then the fitting procedure may seek to fit to that locus a skeletal segment pivotally coupled to a single joint—viz., the neck. If the locus is designated as a forearm, then the fitting procedure may seek to fit a skeletal segment coupled to two joints—one at each end of the segment. Furthermore, if it is determined that a given locus is unlikely to correspond to any body part of the subject, then that locus may be masked or otherwise eliminated from subsequent skeletal fitting. In some embodiments, a virtual skeleton may be fit to each of a sequence of frames of depth video. By analyzing positional change in the various skeletal joints and/or segments, the corresponding movements—e.g., gestures, actions, behavior patterns—of the imaged human subject may be determined.

The foregoing description should not be construed to limit the range of approaches that may be used to construct a virtual skeleton, for a virtual skeleton may be derived from a depth map in any suitable manner without departing from the scope of this disclosure. Moreover, despite the advantages of using a virtual skeleton to model a human subject, this aspect is by no means necessary. In lieu of a virtual skeleton, raw point-cloud data may be used directly to provide suitable posture information.

Returning now to FIG. 3, at 48 the posture information is analyzed to detect a so-called 'engagement gesture' from the selected human subject. An engagement gesture is a signal from the subject that he or she wishes to provide user input to computer system 18. The engagement gesture to be analyzed for may include any, some, or all of the following actions. It may include the raising of a hand of the subject to a zone above the subject's waist and between the subject's torso and display plane 20. Again, the display plane may be the presentation locus of various user-interface elements of computer system 18, so it is natural that the intended user would direct his or her engagement to the display plane. In the engagement gesture, the raising of the subject's hand may be followed by a pause during which the hand is stationary. Aspects of this engagement gesture are shown by example in FIG. 5. In one embodiment, the zone 56 into which the hand is raised may extend above the head of the human subject—just above the head for a standing subject, or higher if the subject is seated or lying down. The zone may also extend about one arm's length on both sides of the subject.

In one embodiment, the raising of the subject's hand in the engagement gesture may be followed immediately by the pause. In this and other embodiments, the pause may last one second, one half second, one quarter second, or less. In one embodiment, the pause may be the final action of the engagement gesture. As such, the detected engagement gesture may lack any substantial side-to-side motion of the hand, such as repeated side-to-side motion, or hand waving. Furthermore, the engagement gesture may be one in which the hand making the gesture is not in contact with any other part of the subject's body—e.g. face, hair, chest, or hips—nor with any other object.

Figure 5:
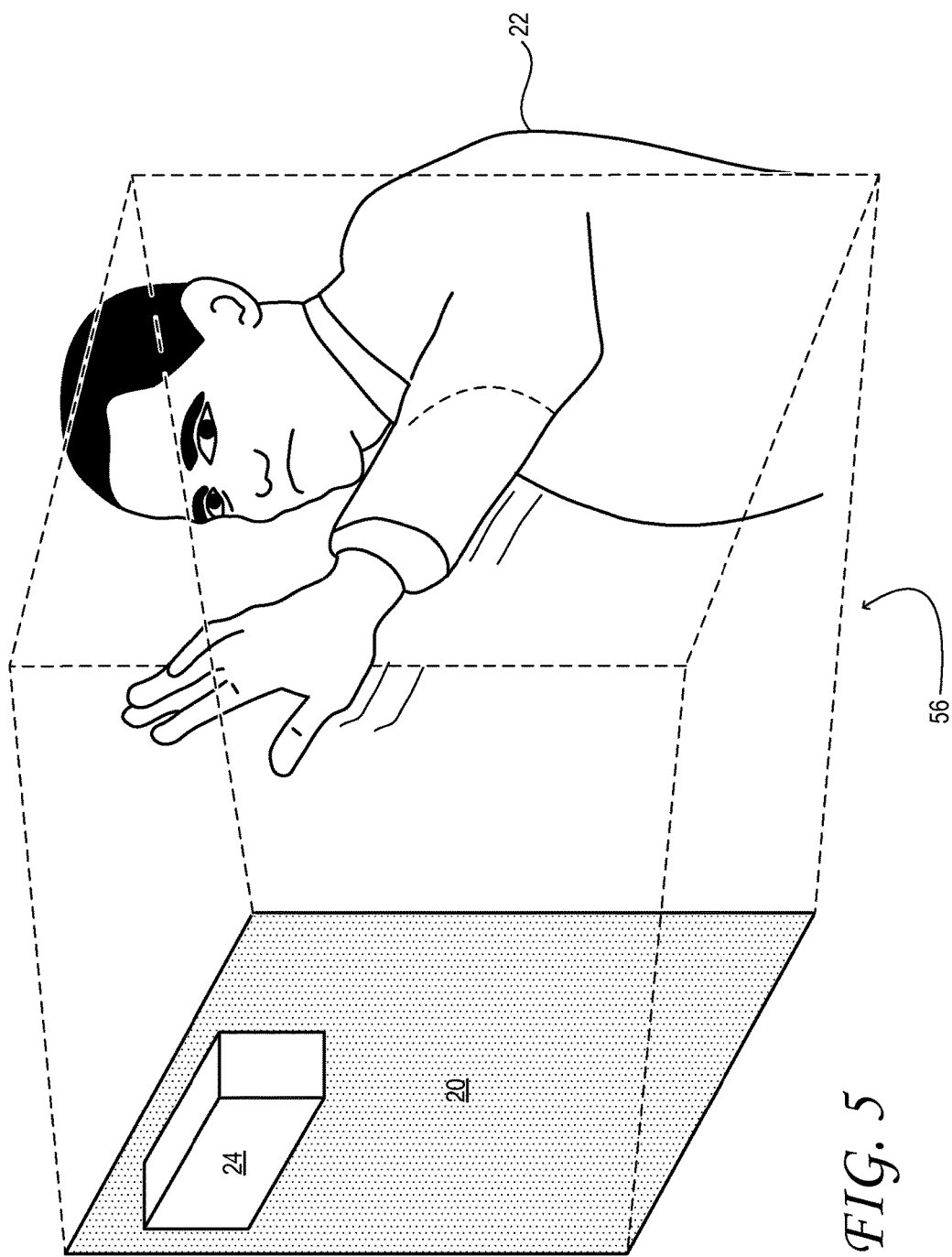
FIG. 5 shows aspects of an example engagement gesture in accordance with an embodiment of this disclosure.

In one embodiment, the engagement gesture may be an open-palm gesture, as shown in FIG. 5. Further, the engagement gesture may be one in which a palm of the gesture-making hand faces display plane 20. In this and other embodiments, the engagement gesture may be one in which a torso of the human subject faces the display plane. In another embodiment, the engagement gesture may be one in which a finger of the gesture-making hand is pointed toward the display plane, or toward the depth camera.

In some embodiments, an apparent engagement gesture detected from a subject may be ignored if that subject is moving—e.g., walking—through the FOV of the depth camera. To efficiently determine whether the subject is moving through the FOV, the centroid of the subject may be located and tracked through successive frames of the depth video. Accordingly, an engagement gesture, even if detected, may be ignored unless the centroid of the human subject is stationary, or nearly so. Moreover, the engagement gesture may be ignored unless the face of the subject is directed toward display plane 20. In embodiments in which NUI interface system 24 provides gaze-tracking in addition to depth imaging, the engagement gesture may be ignored unless the subject's gaze is in the direction of the display plane.

Such gestures may be detected based on relative virtual joint positions, rotations, velocities, and accelerations of a virtual skeleton. For example, a height of a hand joint may be compared to a height of a hip joint, and a depth of a hand joint may be compared to a depth of a shoulder joint when determining if the subject's hand is above her waist and between her torso and the display plane.

Returning again to FIG. 3, at 58 of method 42 it is determined whether a suitable engagement gesture is detected. In general, a yes/no determination of whether the engagement gesture is detected may fold in any, some, or all of the conditions set forth above. In one embodiment, the yes/no determination may result from a fuzzy-logic evaluation of any, some, or all of these conditions. In other embodiments, any, some, or all of these conditions may be output as independent classifiers, which may be combined in various ways to arrive at an indication of user engagement. These variants are further described hereinafter, in the context of FIG. 6.

Continuing now in FIG. 3, if an engagement gesture is detected, then the method advances to 60, where posture information for the subject is processed as user input to computer system 18. If no engagement gesture is detected, then the method returns to 46. In some embodiments, NUI interface system 24 may provide feedback (via display 14 or loudspeakers 16, for example) to indicate to the engaged human subject that he or she is now providing NUI to the computer system.

In one embodiment, NUI interface system 24 may process the posture information as user input to computer system 18 as soon as the engagement gesture is detected, but may forego processing the posture information as user input until the engagement gesture is detected. In this way, movements of a user that are not intended to control a computing system will not result in unintended computing consequences.

In embodiments in which the engagement gesture ends with a pause of the hand, the posture information may be processed as user input immediately after the pause is detected. In scenarios in which the NUI interface system forgoes processing the posture information for the human subject until an engagement gesture from that subject is detected, the unprocessed video may be saved for subsequent processing, or simply ignored. In embodiments in which the unprocessed video is saved prior to detection of the engagement gesture, such video may be processed retroactively if the engagement gesture is later detected. This feature may be valuable in scenarios in which a user is unaware that he or she has not engaged the NUI interface system, and unknowingly issues a series of gestural commands to control the computer system. In that case, the user need only provide the engagement gesture, and some or all of the previously issued commands will take effect. Naturally, a time limit may be enforced to limit the latency of the user input being processed.

In general, posture information may be processed as user input to any component of computer system 18—e.g., operating system 26 or any application 28 launched from the operating system. In one example scenario, the user input may be received by the operating system, where it causes the operating system to launch a particular application. For instance, placing a hand to one's ear may tell the operating system to launch a media-player application. In other scenarios, the user input may be received by an application already running on the computer system. There, it may direct a particular action or function of the application. From within the media-player application, for instance, a twirling gesture made with one's finger may command a replay of the most recently played song.

No aspect of method 42 should be interpreted in a limiting sense, for numerous variations and departures also lay within the spirit and scope of this disclosure. For example, 'the depth camera 34' referred to hereinabove may be one of a plurality of depth cameras installed in the same environment 10. These depth cameras may be connected to the same NUI interface system 24 or to different systems networked together. In either case, an engagement gesture may be detected from a human subject in the FOV of each depth camera, signaling engagement of different users with different computer systems or with different components of the same computer system. Moreover, a suitable method for providing user input to a computer system need not include the act of selecting per se a human subject from among a plurality of candidate human subjects (44 in method 42). In many scenarios, there may be only one human subject in the FOV of a connected depth camera. In other embodiments, user input from every identified human subject may be processed as input to the computer system. There, a conflict-resolution protocol may be used to reconcile conflicting user input from a plurality of human subjects. In still other examples, a numerical engagement metric may be computed for each human subject found in the depth video. By comparison of the engagement metrics computed for each of subject, the NUI interface system may determine which subject will provide the user input. This approach is better explained in the context of the next example method.

Figure 6:
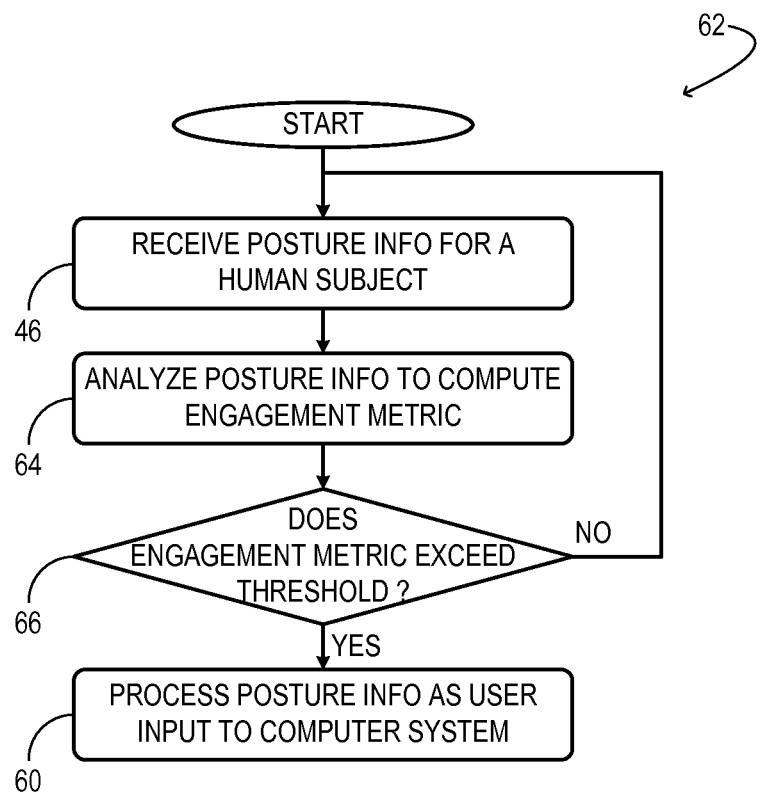
FIG. 6 illustrates another example method for providing user input to a computer system in accordance with an embodiment of this disclosure.

FIG. 6 illustrates another example method 62 for providing user input to a computer system. At 46 of method 62, posture information for a human subject is received. At 64 the posture information is analyzed to compute an engagement metric—a numerical value that reflects the extent of engagement of the human subject with the NUI interface system. The engagement metric may span any convenient range—0 to 100% engaged, for example. In particular, the engagement metric may increase with greater indication that the user wishes to engage the computer system and decrease with lesser indication that the user wishes to engage the computer system. In this method, the modes of analysis of the posture information may be analogous to those described in the context of method 42.

In one embodiment, the engagement metric may increase on detection of an engagement gesture as defined hereinabove. In other words, the engagement metric may increase on detection of a gesture that includes the raising of a hand of the subject to a zone above the subject's waist and between the subject's torso and the display plane, followed by a pause during which the hand is stationary.

In this and other embodiments, various other conditions observed from the depth data or from other sensory data may influence the numerical value of the engagement metric. For example, the engagement metric may increase with increasing final height of the raised hand, increasing final distance of the hand from the torso, increasing duration of the pause, and/or detection of hand waving. The engagement metric may also increase with increasing openness of the hand, and/or detection of finger pointing in the direction of the display plane. Conversely, the engagement metric may decrease with decreasing distance of the hand to the face, head, or body of the subject, or to another object. The engagement metric may also decrease with increasing angle between the display-plane normal and the direction in which the torso, face, or gaze of the subject is directed. The engagement metric may also decrease with increasing velocity of the centroid of the human subject.

In some embodiments, the engagement metric may increase with increasing vehemence of the engagement gesture. The inference here is that a user who fails to engage the NUI interface system with a subtle or minimal engagement gesture may subsequently enact a more definitive, prolonged, or perhaps exaggerated gesture, in order to get the system's attention. Increasingly vehement gestures may include a slower, more deliberate raising of the hand, raising the hand to a higher position, or to a position closer to the depth camera. Detection of any or all, some, or all of these features in the engagement gesture may cause an increase in the engagement metric.

In some embodiments, the engagement metric may be evaluated even in the absence of a discrete engagement gesture. In general, input from various classifiers may be combined to construct a suitable engagement metric. Non-limiting examples of such classifiers may include a machine-learned engagement classifier, a degree-of-facing-sensor classifier, a distance-to-sensor classifier, a hands-being-open classifier, an arms-being-raised-above-head classifier, a player-waving classifier, a player-posture classifier, and/or a face-expression classifier. This combination of classifiers may be referred to as a 'voting system' or 'linear opinion pool'. It may be instantiated as a linear weighted sum y of n individual classifier outputs x. For example, $$y = \alpha_1 x_1 + \alpha_2 x_2 + \ldots + \alpha_n x_n + c,$$

where $\alpha_i$ represents the weighting factor for $x_i$, and where c is a constant.

In some embodiments, a machine-learning approach may be applied to determine the appropriate weighting factors to use in combining the various classifiers, so that the sum will reliably indicate user engagement. Machine learning can also be used to find the appropriate engagement thresholds that determine whether or not the user is engaged (vide supra).

In some embodiments, the engagement metric may be further based on microphonic input from the human subject. For example, a user desiring to engage the NUI interface system may say "computer" or "xbox," as appropriate. In one embodiment, a directional microphone array coupled to the NUI interface system may map the audio data as originating with a particular human subject. Accordingly, the engagement metric for that subject may be increased. Conversely, a person that finds himself engaged with the NUI interface system but does not wish to be engaged may say "not me" or "go away," to decrease his or her engagement metric. In some embodiments, such audio input may be received and mapped to the correct human subject using a non-directional microphone augmented with a video-based lip-reading feature enacted in the NUI interface system.

Continuing in FIG. 6, at 66 it is determined whether the engagement metric exceeds an engagement threshold. If the engagement metric exceeds the engagement threshold, then the method advances to 60, where posture information for the subject is processed as user input to computer system 18. If no engagement gesture detected, then the method returns to 46. Accordingly, NUI interface system 24 determines, based on the engagement metric, whether to process the posture information as user input to the computer system or to forego such processing.

The engagement threshold may be set to any suitable level, depending on conditions. For example, the engagement threshold may be maintained at a higher level when posture information from another human subject is being processed as user input to computer system 18, and at a lower level when no user input is being provided to the computer system.

In one embodiment, the engagement threshold may decrease with increasing vehemence of the engagement gesture. With reference to the above discussion, NUI interface system 24 may, under some conditions, detect that a user repeatedly makes exaggerated or prolonged gestures or calls loudly to the computer in an attempt to engage the system. Such observations may indicate that the engagement threshold is set too high for current conditions. Therefore, the NUI interface system may lower the engagement threshold to improve the user experience.

As noted above, method 62 may also be used in scenarios in which posture information for more than one human subject is received and analyzed concurrently by the NUI interface system. Here, an engagement metric may be computed for each of the human subjects. Posture information for the human subject having the highest engagement metric may be processed as user input to the computer system, with the engagement metrics associated with the other human subjects serving, effectively, as the engagement threshold.

In this scenario, it may be intended that a first human subject engage the computer system for a first period of time, and that a second human subject engage the computer system for a second, subsequent period of time. Accordingly, this disclosure also provides detection of disengagement of a currently engaged user. In one embodiment, disengagement of a user may be triggered by that user's engagement metric falling below the engagement threshold. In another embodiment, a separate disengagement threshold may be provided for comparison against the engagement metric. The disengagement threshold may be somewhat lower than the associated engagement threshold. In this manner, a predetermined amount of hysteresis may separate engagement and disengagement, to avoid unwanted disengagement of engaged user while keeping the engagement threshold high enough to avoid false-positive indications of engagement. In this and other embodiments, the presence of a currently engaged user may contribute significantly to the engagement threshold for other potential users. Accordingly, a person wishing to take control of the computer system from a current user may be required not only to exceed that user's engagement threshold, but to exceed it by a significant delta. This feature may help to avoid unwanted 'stealing' of user engagement. It still other embodiments, a discrete disengagement gesture by a current user may be used to signal the intention to disengage. The disengagement gesture can be as simple as moving one's hands away from the display plane, onto one's lap, or out of view of the camera, for example.

As evident from the foregoing description, the methods and processes described herein may be tied to a computing system of one or more computing devices. Such methods and processes may be implemented as a computer-application program or service, an application-programming interface (API), a library, and/or other computer-program product.

Shown in FIG. 2 in simplified form, NUI interface system 24 is one, non-limiting example of a computing system that can enact one or more of the methods and processes described herein. As noted hereinabove, the NUI interface system includes a logic machine 30 and an instruction-storage machine 32. NUI interface system 24, or computer system 18, which receives user input from the NUI interface system, may optionally include a display 14, a communication subsystem 68, and/or other components not shown in FIG. 2.

Logic machine 30 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 30 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Instruction-storage machine 32 includes one or more physical devices configured to hold instructions executable by logic machine 30 to implement the methods and processes described herein. When such methods and processes are implemented, the state of the instruction-storage machine may be transformed—e.g., to hold different data. The instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The instruction-storage machine may include volatile, nonvolatile, dynamic, static, read/write, read-only, random-access, sequential-access, location-addressable, file-addressable, and/or content-addressable devices.

It will be appreciated that instruction-storage machine 32 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 30 and instruction-storage machine 32 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computing system 70 implemented to perform a particular function. In some cases, a module, program, or engine may be instantiated via logic machine 30 executing instructions held by instruction-storage machine 32. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, communication subsystem 68 may be configured to communicatively couple NUI interface system 24 or computer system 18 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow NUI interface system 24 or computer system 18 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A natural user-input (NUI) system to provide user input to a computer system, the NUI system including a logic machine and an instruction-storage machine, the instruction-storage machine holding instructions executable by the logic machine, the instructions comprising:
   instructions to receive posture information derived from depth video of a person, the depth video acquired with a depth camera;
   instructions to analyze the received posture information to compute an engagement metric for the person, the engagement metric increasing with greater indication that the person wishes to engage the computer system as a user, and decreasing with lesser indication that the person wishes to engage the computer system;
   instructions to assess user input being provided to the computer system;
   instructions to permit facile initial engagement of the person as the user and prevent loss of user engagement to another person in the depth video by maintaining a variable threshold at a first level responsive to posture information from a currently engaged user being processed as user input to the computer system, and at a second level, lower than the first level, responsive to there being no currently engaged user;
   instructions to process the received posture information as user input to the computer system only after the engagement metric exceeds the variable threshold;
   instructions to forego processing the received posture information as input of an engaged user of the computer system and to save the received posture information for subsequent processing until the engagement metric exceeds the variable threshold; and
   instructions to retroactively process the saved posture information as input of an engaged user of the computer system after the engagement metric exceeds the variable threshold.

2. The system of claim 1 wherein the person is one of a plurality of persons for whom the logic machine receives and analyzes posture information, wherein the engagement metric is computed for each of the persons, and wherein the posture information for the person having the highest engagement metric is processed as user input to the computer system.

3. The system of claim 1 wherein the variable threshold decreases with increasing vehemence of an engagement gesture of the person.

4. The system of claim 1 wherein the engagement metric increases with increasing vehemence of an engagement gesture of the person.

5. The system of claim 1 wherein the engagement metric is further based on microphonic data from the person.

6. A natural user-input (NUI) system to provide user input to a computer system, the NUI system including a logic machine and an instruction-storage machine, the instruction-storage machine holding instructions executable by the logic machine, the instructions comprising:
   instructions to receive, for the human subject, posture information derived from depth video of that subject, the depth video acquired with a depth camera;
   instructions to analyze the received posture information to detect an engagement gesture from the human subject, the engagement gesture including a raising of a hand of the subject to a zone above the subject's waist and between the subject's torso and a display plane of the computer system, the raising followed by a pause during which the hand is stationary;
   instructions to process the received posture information as input of an engaged user of the computer system after detection of the engagement gesture;
   instructions to forego processing the received posture information as input of an engaged user of the computer system and to save the received posture information for subsequent processing until the engagement gesture is detected; and
   instructions to retroactively process the saved posture information as input of an engaged user of the computer system upon detection of the engagement gesture.

7. The system of claim 6 wherein the raising is followed immediately by the pause, and wherein the posture information is processed as the user input immediately after the pause.

8. The system of claim 6 wherein the engagement gesture is detected absent side-to-side motion of the hand.

9. The system of claim 6 wherein the engagement gesture is an open-palm gesture.

10. The system of claim 6 wherein the engagement gesture is one in which a palm of the hand faces the display plane.

11. The system of claim 6 wherein the engagement gesture is one in which a finger of the hand is pointed toward the display plane.

12. The system of claim 6 wherein the engagement gesture is one in which a torso of the human subject faces the display plane.

13. The system of claim 6 wherein the engagement gesture is one in which a centroid of the human subject is substantially stationary.

14. The system of claim 6 wherein the engagement gesture is one in which a face or gaze of the human subject is directed toward the display plane.

15. The system of claim 6 wherein the zone extends above a head of the human subject and one arm's length on both sides of the human subject.

16. The system of claim 6 wherein the pause is one-quarter second to one second in duration, and wherein the posture information is processed as the user input immediately after the pause.

17. A natural user-input (NUI) system to provide user input to a computer system, the NUI system including a logic machine and an instruction-storage machine, the instruction-storage machine holding instructions executable by the logic machine, the instructions comprising:

instructions to select a human subject to provide user input to the computer system;

instructions to receive, for the human subject, posture information derived from depth video of that subject, the depth video acquired with a depth camera;

instructions to analyze the received posture information to compute an engagement metric for the human subject, the engagement metric increasing with greater indication that the user wishes to engage the computer system and decreasing with lesser indication that the user wishes to engage the computer system;

instructions to detect an engagement gesture of the human subject when the engagement metric exceeds a threshold;

instructions to process the received posture information as input of an engaged user of the computer system after detection of the engagement gesture;

instructions to forego processing the received posture information as input of an engaged user of the computer system and to save the received posture information for subsequent processing until the engagement gesture is detected; and instructions to retroactively process the saved posture information as input of an engaged user of the computer system upon detection of the engagement gesture.

18. The system of claim 17 wherein the human subject is selected based on proximity to the depth camera and/or position in a field of view of the depth camera.

\* \* \* \* \*